US011301587B2

(12) United States Patent
Jain et al.

(10) Patent No.: US 11,301,587 B2
(45) Date of Patent: Apr. 12, 2022

(54) SYSTEMS AND METHODS FOR MASKING AND UNMASKING OF SENSITIVE DATA

(71) Applicant: Tata Consultancy Services Limited, Mumbai (IN)

(72) Inventors: Mayur Jain, Pune (IN); Shirish Damle, Pune (IN); Ashim Roy, Pune (IN); Anushka Sharma, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 109 days.

(21) Appl. No.: 16/912,847

(22) Filed: Jun. 26, 2020

(65) Prior Publication Data

US 2021/0064783 A1   Mar. 4, 2021

(30) Foreign Application Priority Data

Aug. 27, 2019   (IN) .............................. 201921034495

(51) Int. Cl.
*G06F 21/00*   (2013.01)
*G06F 21/62*   (2013.01)
(Continued)

(52) U.S. Cl.
CPC .......... *G06F 21/6254* (2013.01); *G06F 17/17* (2013.01); *G11C 7/1012* (2013.01)

(58) Field of Classification Search
CPC . G06F 21/6254; G06F 17/17; H04L 2209/04; H04L 9/065; H04L 9/002; G11C 7/1012
See application file for complete search history.

(56) References Cited

U.S. PATENT DOCUMENTS 8,826,370 B2 * 9/2014 Boukobza ......... G06F 16/24534
726/1
9,547,769 B2 * 1/2017 Aissi ....................... H04L 63/20
(Continued)

FOREIGN PATENT DOCUMENTS

| EP | 1341101 A2 * | 9/2003 | ........... G06F 16/334 |
| WO | WO-2008073824 A1 * | 6/2008 | ............. G11C 15/00 |

OTHER PUBLICATIONS

Santos et al., "A data masking technique for data warehouses", IDEAS'11: Proceedings of the 15th Symposium on International Database Engineering & Applications, pp. 61-69, Sep. 2011.*

*Primary Examiner* — Morshed Mehedi
(74) *Attorney, Agent, or Firm* — Finnegan, Henderson, Farabow, Garrett & Dunner LLP

(57) ABSTRACT

This disclosure relates generally to systems and methods for masking and unmasking of sensitive data. The present systems and methods solve the problems of consistency of the data masking, by using a random index and a masked index with use of regular expression concept. An additional random key produce different masked data versions, however the original form of the sensitive data is achieved with any masked data version. Plurality of masked data versions are generated by masking the sensitive input dataset, where the plurality of masked data versions comprises same format of the sensitive input dataset. The generated masked data versions are secured and hard to predict the original form of the sensitive input dataset by authorized or unauthorized environments. Also, the present method consume less processing time, as the masking process and the unmasking process make operations on the indexes rather than with the original dataset.

11 Claims, 5 Drawing Sheets

(51) Int. Cl.
*G06F 17/17* (2006.01)
*G11C 7/10* (2006.01)

(56) References Cited

U.S. PATENT DOCUMENTS

| | | | |
|---|---|---|---|
| 10,242,203 B2 | 3/2019 | Shetty et al. | |
| 2013/0080398 A1* | 3/2013 | Booth | G06F 21/6254 707/687 |
| 2014/0298039 A1* | 10/2014 | Pandya | G06F 3/0679 713/190 |
| 2017/0337386 A1* | 11/2017 | Kumaresan | G06F 21/604 |

* cited by examiner

SYSTEMS AND METHODS FOR MASKING AND UNMASKING OF SENSITIVE DATA

PRIORITY CLAIM

This U.S. patent application claims priority under 35 U.S.C. § 119 to: Indian Patent Application No. 201921034495, filed on 27 Aug. 2019. The entire contents of the aforementioned application are incorporated herein by reference.

TECHNICAL FIELD

The disclosure herein generally relates to data privacy, and, more particularly, to systems and methods for masking and unmasking of sensitive data.

BACKGROUND

Data privacy is a major concern for most of industries where a majority of information is dealt with sensitive data such as bank details, citizenship details and so on. Data masking is a technique that alters the sensitive data from its original form, so that the original form of the sensitive data is protected. Main objective of the data masking is to hide the original form of the sensitive data and to generate a masked data which has a same format of the original form. An efficient data masking technique ensures protection of the original form of the sensitive data, even if the masked data is made available to an authorized or unauthorized environments.

Conventional data masking techniques make use of static maps and dynamic maps for generating the masked data from the original input dataset. The static maps are generated based on the sensitive data elements comprised in an input dataset and hence a processing time for masking operation may increases as the input dataset increases. Also, there may be a possibility that the original input dataset is predicted through the static maps and hence the aforementioned conventional technique may not be secure.

Using the dynamic maps, a consistency in masked dataset may not be achieved as same masked data version may not be achieved at each masking operation iteration and the original input dataset may not be re-generated with any masked data version. Hence the data masking technique that ensures better consistency, security and consume the less processing time, is a continuous area of an improvement.

SUMMARY

Embodiments of the present disclosure present technological improvements as solutions to one or more of the above-mentioned technical problems recognized by the inventors in conventional systems.

In an aspect, there is provided a processor-implemented method comprising: receiving, via one or more hardware processors, an input dataset comprising a plurality of sensitive data elements, a random key and a first regular expression, wherein each of the plurality of sensitive data elements comprises a data pattern, the first regular expression is received based on the data pattern of the plurality of sensitive data elements; categorizing, via the one or more hardware processors, the input dataset into a valid input dataset and an invalid input dataset, based on the first regular expression, wherein the valid input dataset comprises one or more valid sensitive data elements from amongst the plurality of sensitive data elements and the invalid input dataset comprises zero or at least one invalid sensitive data elements from amongst the plurality of sensitive data elements; receiving, via the one or more hardware processors, a second regular expression based on the data pattern of the at least one invalid sensitive data elements comprised in the invalid input dataset; identifying, via the one or more hardware processors, a first range of index based on a number of elements comprised in the first regular expression and a second range of index based on the number of elements comprised in the second regular expression, wherein the first range of index comprises a first list of indexes and the second range of index comprises a second list of indexes; obtaining, via the one or more hardware processors, a random index for each of the one or more valid sensitive data elements based on a position of the associated valid sensitive data element in the first list of indexes and a random index for each of the at least one invalid sensitive data elements based on a position of the associated invalid sensitive data element in the second list of indexes; arranging sequentially, via the one or more hardware processors, the first list of indexes in a first matrix and the second list of indexes in a second matrix, wherein the first matrix comprises M number of rows and N number of columns, and the second matrix comprises P number of rows and Q number of columns; performing, via the one or more hardware processors, based on the random key, one or more rotation operations, sequentially, in a first direction, on list of indexes comprised in each row and each column of the first matrix, and on the list of indexes comprised in each row and each column of the second matrix, to obtain a third matrix and a fourth matrix, respectively; obtaining, via the one or more hardware processors, a masked index for each of the one or more valid sensitive data elements based on the associated random index and the third matrix, and a masked index for each of the at least one invalid sensitive data elements based on the associated random index and the fourth matrix; and generating, via the one or more hardware processors, a masked data element for each of the one or more valid sensitive data elements based on the associated masked index, the first regular expression and the first list of indexes, and a masked data element for each of the at least one invalid sensitive data elements based on the associated masked index, the second regular expression and the second list of indexes, to form a masked dataset for the input dataset.

In another aspect, there is provided a system for masking and unmasking of sensitive data, the system comprising: a memory storing instructions; one or more communication interfaces; and one or more hardware processors coupled to the memory via the one or more communication interfaces, wherein the one or more hardware processors are configured by the instructions to: receive an input dataset comprising a plurality of sensitive data elements, a random key and a first regular expression, wherein each of the plurality of sensitive data elements comprises a data pattern, the first regular expression is received based on the data pattern of the plurality of sensitive data elements; categorize the input dataset into a valid input dataset and an invalid input dataset, based on the first regular expression, wherein the valid input dataset comprises one or more valid sensitive data elements from amongst the plurality of sensitive data elements and the invalid input dataset comprises zero or at least one invalid sensitive data elements from amongst the plurality of sensitive data elements; receive a second regular expression based on the data pattern of the at least one invalid sensitive data elements comprised in the invalid input dataset; identify a first range of index based on a number of elements comprised in the first regular expression and a second range of index based on the number of elements comprised in the second regular expression, wherein the first range of index comprises a first list of indexes and the second range of index comprises a second list of indexes; obtain a random index for each of the one or more valid sensitive data elements based on a position of the associated valid sensitive data element in the first list of indexes and a random index for each of the at least one invalid sensitive data elements based on a position of the associated invalid sensitive data element in the second list of indexes; arrange sequentially, the first list of indexes in a first matrix and the second list of indexes in a second matrix, wherein the first matrix comprises M number of rows and N number of columns, and the second matrix comprises P number of rows and Q number of columns; perform, based on the random key, one or more rotation operations, sequentially, in a first direction, on list of indexes comprised in each row and each column of the first matrix, and on the list of indexes comprised in each row and each column of the second matrix, to obtain a third matrix and a fourth matrix, respectively; obtain a masked index for each of the one or more valid sensitive data elements based on the associated random index and the third matrix, and a masked index for each of the at least one invalid sensitive data elements based on the associated random index and the fourth matrix; and generate a masked data element for each of the one or more valid sensitive data elements based on the associated masked index, the first regular expression and the first list of indexes, and a masked data element for each of the at least one invalid sensitive data elements based on the associated masked index, the second regular expression and the second list of indexes, to form a masked dataset for the input dataset.

In yet another aspect, there is provided a computer program product comprising a non-transitory computer readable medium having a computer readable program embodied therein, wherein the computer readable program, when executed on a computing device, causes the computing device to: receive an input dataset comprising a plurality of sensitive data elements, a random key and a first regular expression, wherein each of the plurality of sensitive data elements comprises a data pattern, the first regular expression is received based on the data pattern of the plurality of sensitive data elements; categorize the input dataset into a valid input dataset and an invalid input dataset, based on the first regular expression, wherein the valid input dataset comprises one or more valid sensitive data elements from amongst the plurality of sensitive data elements and the invalid input dataset comprises zero or at least one invalid sensitive data elements from amongst the plurality of sensitive data elements; receive a second regular expression based on the data pattern of the at least one invalid sensitive data elements comprised in the invalid input dataset; identify a first range of index based on a number of elements comprised in the first regular expression and a second range of index based on the number of elements comprised in the second regular expression, wherein the first range of index comprises a first list of indexes and the second range of index comprises a second list of indexes; obtain a random index for each of the one or more valid sensitive data elements based on a position of the associated valid sensitive data element in the first list of indexes and a random index for each of the at least one invalid sensitive data elements based on a position of the associated invalid sensitive data element in the second list of indexes; arrange sequentially, the first list of indexes in a first matrix and the second list of indexes in a second matrix, wherein the first matrix comprises M number of rows and N number of columns, and the second matrix comprises P number of rows and Q number of columns; perform, based on the random key, one or more rotation operations, sequentially, in a first direction, on list of indexes comprised in each row and each column of the first matrix, and on the list of indexes comprised in each row and each column of the second matrix, to obtain a third matrix and a fourth matrix, respectively; obtain a masked index for each of the one or more valid sensitive data elements based on the associated random index and the third matrix, and a masked index for each of the at least one invalid sensitive data elements based on the associated random index and the fourth matrix; and generate a masked data element for each of the one or more valid sensitive data elements based on the associated masked index, the first regular expression and the first list of indexes, and a masked data element for each of the at least one invalid sensitive data elements based on the associated masked index, the second regular expression and the second list of indexes, to form a masked dataset for the input dataset.

In an embodiment of the present disclosure, the number of columns (N) of the first matrix is obtained based on a number of indexes comprised in the first range of index, and the number of columns (Q) of the second matrix is obtained based on the number of indexes comprised in the second range of index.

In an embodiment of the present disclosure, the number of rows (M) of the first matrix is obtained based on the number of columns (N) and the number of indexes comprised in the first range of index, and the number of rows (P) of the second matrix is obtained based on the number of columns (Q) and the number of indexes comprised in the second range of index.

In an embodiment of the present disclosure, wherein the number of rotation operations for each row and each column of the first matrix and the second matrix are obtained by using a random function and a hash code of the random key.

In an embodiment of the present disclosure, the processor-implemented method further comprising unmasking the masked dataset, where unmasking the masked dataset comprises: receiving, via the one or more hardware processors, the random key, the first regular expression, the second regular expression and the masked dataset comprising the plurality of masked data elements, wherein each of the plurality of masked data elements comprises a data pattern; categorizing, via the one or more hardware processors, the masked dataset into a valid masked dataset and an invalid masked dataset, based on the first regular expression and the second regular expression, respectively, wherein the valid masked dataset comprises one or more valid masked data elements from amongst the plurality of masked data elements and the invalid masked dataset comprises zero or at least one invalid masked data elements from amongst the plurality of masked data elements; performing, via the one or more hardware processors, based on the random key, one or more rotation operations, sequentially, in a second direction, on list of indexes comprised in each row and each column of the first matrix and on the list of indexes comprised in each row and each column of the second matrix, to obtain a fifth matrix and a sixth matrix respectively, wherein the second direction is opposite to the first direction; obtaining, via the one or more hardware processors, an unmasked index for each of the one or more valid masked data elements based on the first regular expression and the fifth matrix, and for each of the at least one invalid masked data elements based on the second regular expression and the sixth matrix; and generating, via the one or more hardware processors, an unmasked data element for each of the one or more valid masked data elements based on the associated unmasked index and the first regular expression, and for each of the at least one invalid masked data elements based on the associated unmasked index and the second regular expression, to form an unmasked dataset for the masked dataset, wherein the unmasked dataset is the input dataset.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
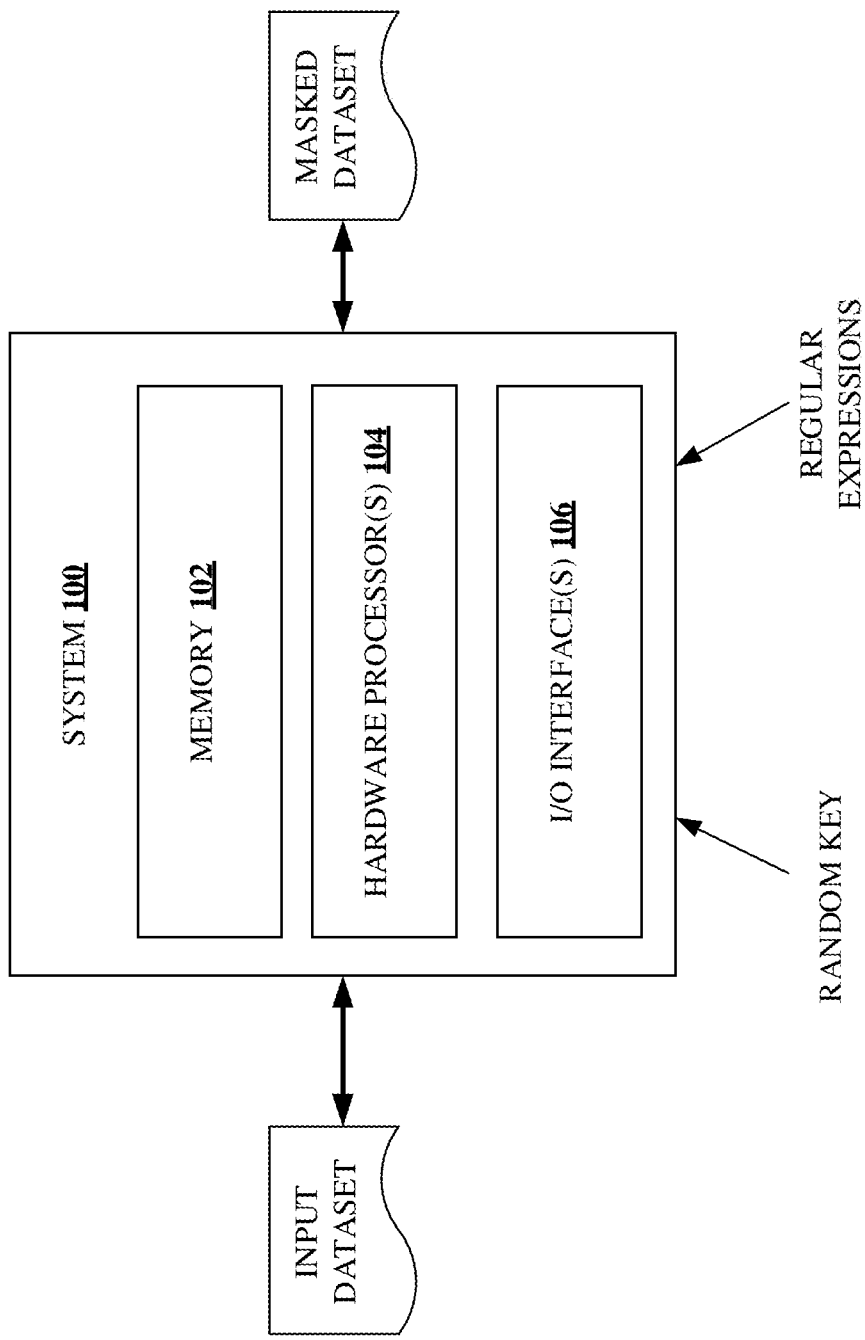
FIG. 1 is an exemplary block diagram of a system for masking and unmasking of sensitive data, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Data masking techniques in the art use reference maps such as static maps and dynamic maps for altering sensitive data from its original form to generate masked data. The use of static maps for masking of the sensitive data may not be secure and may take significantly more processing time for the masking. The use of dynamic maps for masking may lead to inconsistent versions of masked data at each iteration though the sensitive input dataset is same. Accordingly, by using the dynamic maps, an original form of the sensitive data may not be retrieved back while unmasking with any masked data version.

Various embodiments disclosed herein provide methods and systems for masking and unmasking of sensitive data, solves the challenges of consistency of the data masking and security of original form of the sensitive data, by using a random index and a masked index. In addition to the random index and the masked index, the disclosed embodiments facilitate the use of a random key to produce different masked data versions. The original form of the sensitive data is retrieved back with any masked data version using the random index, the masked index and the random key. Moreover, in an embodiment, the disclosed method includes generation of a plurality of masked data versions by masking the sensitive input dataset, where the masked data versions have same format of the input dataset. Predicting the original form of the sensitive input dataset by authorized or unauthorized environments using the masked data versions may be challenging and hence the original form of the sensitive data is secured.

Referring now to the drawings, and more particularly to FIG. 1 through FIG. 3B, where similar reference characters denote corresponding features consistently throughout the figures, there are shown preferred embodiments and these embodiments are described in the context of the following exemplary systems and/or methods.

FIG. 1 is an exemplary block diagram of a system 100 for masking and unmasking of sensitive data, according to some embodiments of the present disclosure. In an embodiment, the system 100 includes one or more hardware processors 104, communication interface device(s) or input/output (I/O) interface(s) 106, and one or more data storage devices or memory 102 operatively coupled to the one or more hardware processors 104. The one or more hardware processors 104 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the system 100 is configured to receive an input dataset and generate a masked dataset based on the random key and regular expressions, by mapping the random index and the masked index with the input dataset. Also, the system 100 is further configured to receive the masked dataset and generate the input dataset based on the random key and the regular expressions by mapping the masked index and an unmasked index with the masked dataset.

Figure 2A:
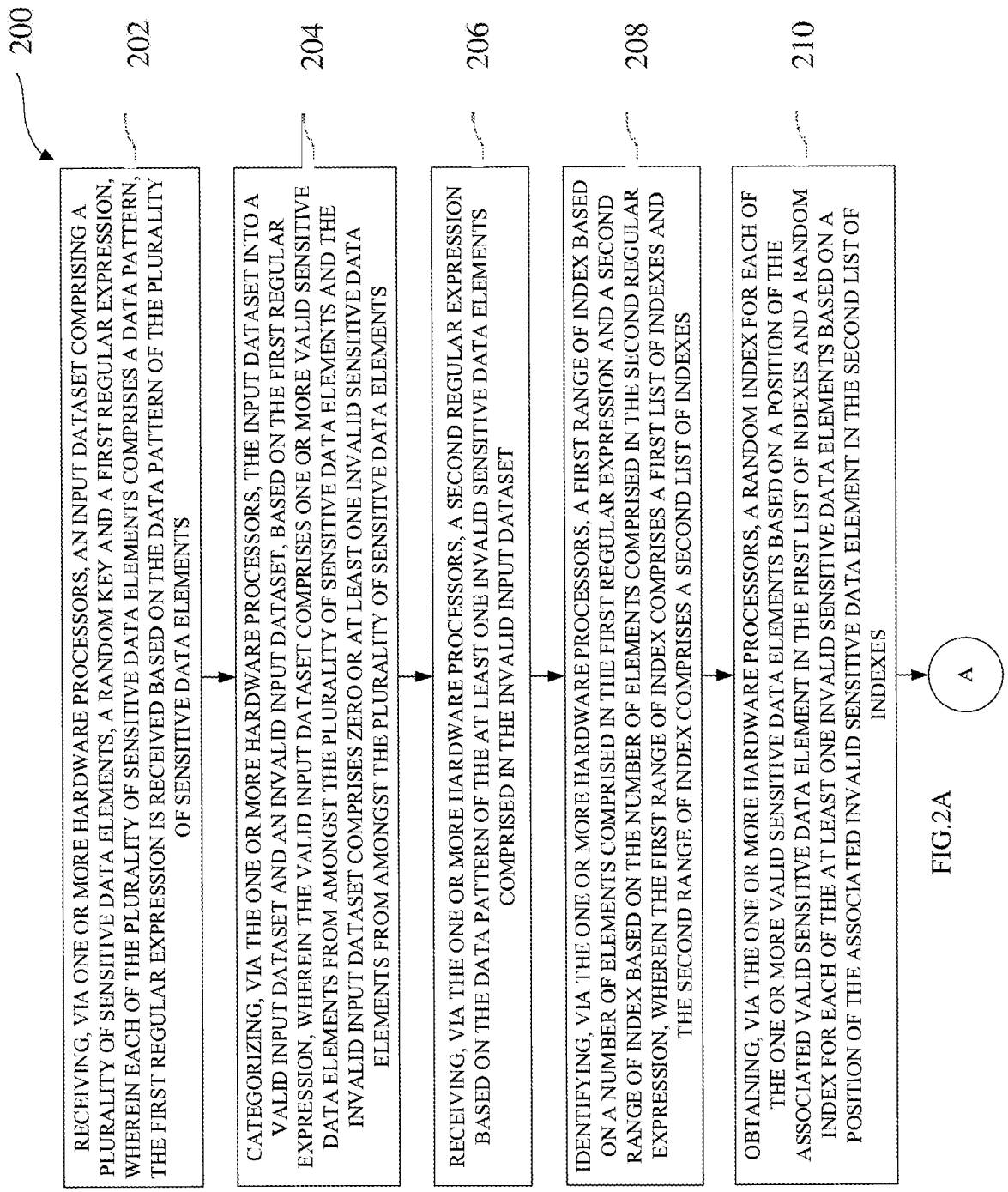
FIG. 2A and FIG. 2B illustrate exemplary flow diagrams of a processor implemented method for masking of sensitive data, in accordance with an embodiment of the present disclosure.
Figure 2B:
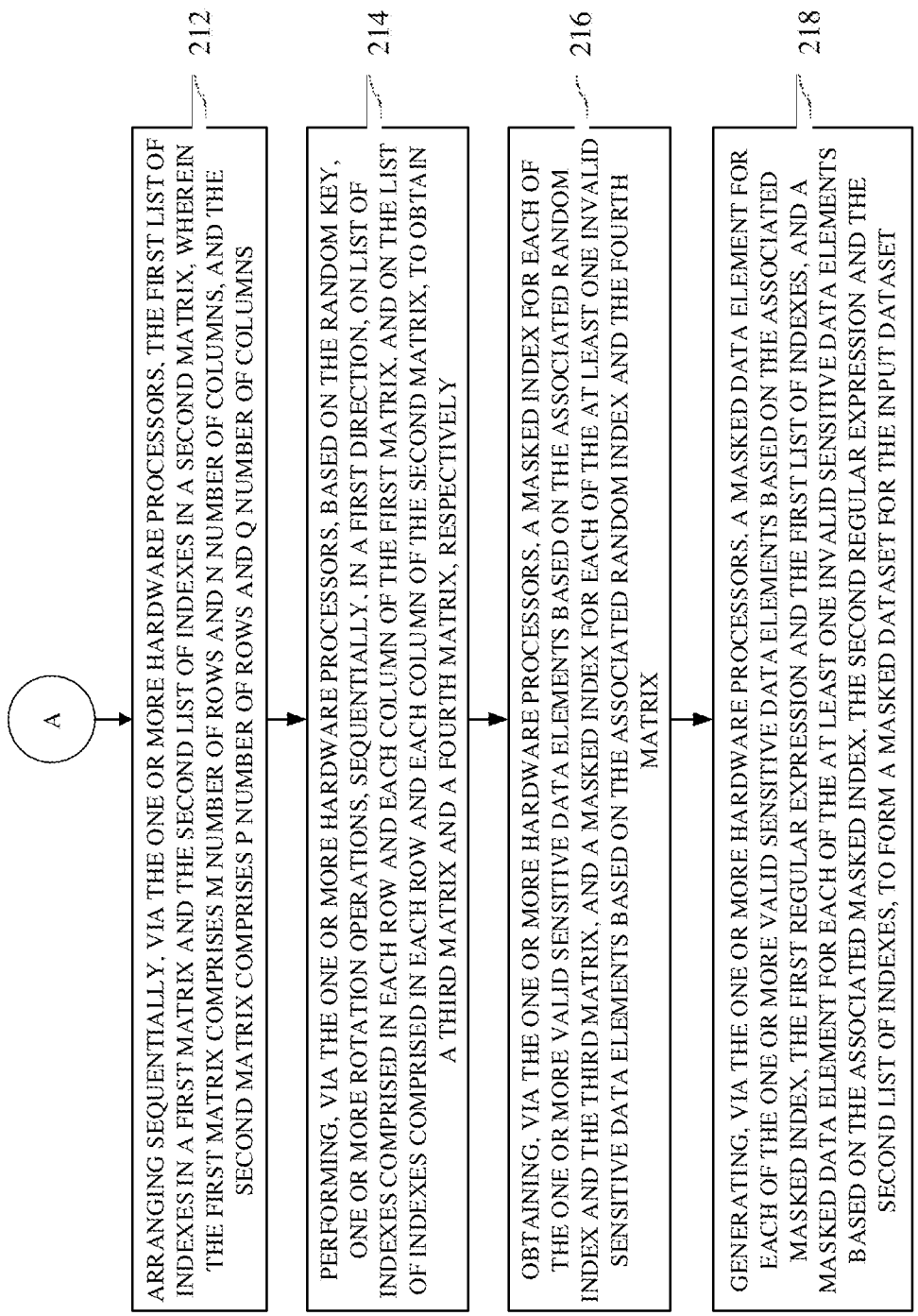

FIG. 2A and FIG. 2B illustrate exemplary flow diagrams of a processor implemented method 200 for masking of sensitive data, in accordance with an embodiment of the present disclosure. The steps of the method 200 with reference to FIG. 2A and FIG. 2B will now be explained in detail with reference to the system 100. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the one or more hardware processors 104 of FIG. 1 are configured to receive an input dataset comprising a plurality of sensitive data elements, the random key and a first regular expression, at 202 of the method 200. Each sensitive data element of the plurality of sensitive data elements includes a data pattern. The data pattern of one sensitive data element may be same or different than the data pattern of another sensitive data element. In an embodiment, the input dataset may be received in a file or document format. The file or the document may be obtained from a data source (s), a database (s), a data file (s) and a like in which the plurality of sensitive data elements are stored or maintained in an organization. In an embodiment, the input dataset may be a set of data fields present in one column comprised in the database. If the database includes multiple columns, then the set of data fields present in one column are received at a time, by the one or more hardware processors 104 of FIG. 1. The random key is a key either randomly selected by a user or generated by the system 100.

For example, a sample input dataset comprising of 12 sensitive data elements and the sample random key are considered to explain in subsequent steps on generation of a sample masked dataset, from the sample input dataset.

Sample input dataset={B, C, T, 1, 4, W, H, S, 6, K, 3, Z}
Sample random Key='DataPlus'

In an embodiment, the first regular expression is received based on the associated data pattern of the plurality of sensitive data elements present in the input dataset. The first regular expression comprises the data pattern that best suits the associated data pattern of most of the plurality of sensitive data elements comprised in the input dataset. In an embodiment, the first regular expression may be generated by the system 100. In an alternate embodiment, the first regular expression may be provided by the user, if the first regular expression is not generated by the system 100. In an embodiment, the first regular expression is generated such that the data pattern of the first regular expression matches the associated data pattern of all or most of the plurality of sensitive data elements comprised in the input dataset. The best suitable first regular expression for the sample input dataset is [A-Z]{1}, where [A-Z] indicate that the input dataset having the plurality of sensitive data elements comprising of uppercase alphabets from A to Z and {1} indicates that the each data element has single alphabet only.

In accordance with an embodiment of the present disclosure, the one or more hardware processors 104 of FIG. 1 are configured to categorize the input dataset into a valid input dataset and an invalid input dataset at 204 of the method 200. In an embodiment, the input dataset is categorized into the valid input dataset and the invalid input dataset based on the first regular expression. The valid input dataset comprises one or more valid sensitive data elements from amongst the plurality of sensitive data elements, whose data pattern matches the data pattern of the first regular expression. The sensitive data elements of the one or more valid sensitive data elements comprised in the valid dataset are placed sequentially in an order in which they have received.

The invalid input dataset comprises zero or at least one of invalid sensitive data elements from amongst the plurality of sensitive data elements. The invalid input dataset comprises zero invalid sensitive data elements i.e, no invalid sensitive data elements, when the data pattern of the first regular expression matches the data patterns of all the sensitive data elements from the plurality of sensitive data elements comprised in the input dataset. If zero invalid sensitive data elements are determined to be present in the invalid input dataset, then the method 200 generate the masked dataset only based on the valid input dataset.

The invalid input dataset comprises at least one invalid sensitive data elements, when the data pattern of the first regular expression does not match the data patterns of at least one of the data sensitive element from the plurality of sensitive data elements comprised in the input dataset. The sensitive data elements of the at least one invalid sensitive data elements comprised in the invalid dataset are placed sequentially in the order in which they have received.

In the given example, the sample input dataset {B, C, T, 1, 4, W, H, S, 6, K, 3, Z} is categorized into the valid input dataset having the valid sensitive data elements {B, C, T, W, H, S, K, Z} and the invalid input dataset having the invalid sensitive data elements {1, 4, 6, 3}, based on the first regular expression [A-Z]{1}.

In accordance with an embodiment of the present disclosure, the one or more hardware processors 104 of FIG. 1 are configured to receive a second regular expression, at 206 of the method 200. In an embodiment, the second regular expression is received, when the invalid input dataset comprises at least one invalid sensitive data elements. In an alternate embodiment, the second regular expression is received as null, when the invalid input dataset comprises zero invalid sensitive data elements. If the second regular expression is received as null, then the method 200 generate the masked dataset only based on the valid input dataset. In an embodiment, the second regular expression may be generated by the system 100. In an alternate embodiment, the second regular expression may be provided by the user, if the second regular expression is not generated by the system 100.

In an embodiment, the second regular expression is received based on the data pattern of the at least one invalid sensitive data elements comprised in the invalid input dataset. In the given example, the best suitable second regular expression for the at least one invalid sensitive data elements comprised in the invalid input dataset is [1-9]{1}, where [1-9] indicate that the invalid input dataset having at least one invalid sensitive data elements comprising of numeric elements from 1 to 9 and {1} indicates that data element is single digit numeric element only.

In accordance with an embodiment of the present disclosure, the one or more hardware processors 104 of FIG. 1 are configured to identify a first range of index and a second range of index, at 208 of the method 200. In an embodiment, the first range of index is identified based on a number of elements comprised in the first regular expression. The second range of index is identified based on the number of elements comprised in the second regular expression. The first range of index comprises a first list of indexes and the second range of index comprises a second list of indexes.

In the given example, the first range of index is identified as '1-26', as the number of elements present in the first regular expression [A-Z]{1} is '26' and the first list of indexes are {1, 2, 3, 4, 5, 6, 7, 8, . . . , 24, 25, 26}. Each index in the first list of indexes are mapped to the elements present in the first regular expression by its corresponding position. Similarly, the second range of index is identified as '1-9', as the number of elements present in the second regular expression [1-9]{9} is '9' and the second list of indexes are {1, 2, 3, 4, 5, 6, 7, 8, 9}. Each index in the second list of indexes are mapped to the elements present in the second regular expression by its corresponding position. In an alternate embodiment, the first range of index is identified based on the range (for example 'A-Z') of the first regular expression and the second range of index is identified based on the range (for example '1-9') of the second regular expression.

In accordance with an embodiment of the present disclosure, the one or more hardware processors 104 of FIG. 1 are configured to obtain the random index for each of the one or more valid sensitive data elements and each of the at least one invalid sensitive data elements, at 210 of the method 200. The random index for each of the one or more valid sensitive data elements is obtained, based on a position of the associated valid sensitive data element in the first list of indexes. Likewise, the random index for each of the at least one invalid sensitive data elements is obtained based on the position of the associated invalid sensitive data element in the second list of indexes.

In an embodiment, the one or more valid sensitive data elements comprised in the valid input dataset are mapped with the indexes comprised in the first list of indexes based on the corresponding position, to obtain the associated random index for each valid sensitive data element. Similarly, the at least one invalid sensitive data elements comprised in the invalid input dataset are mapped with the indexes in the second list of indexes based on the corresponding position, to obtain the associated random index for each invalid sensitive data element.

In the given example, the random index for the valid sensitive data element B' is 2, 'C' is 3, 'T' is 20 and so on, the random index for the valid sensitive data element 'Z' is 26. Similarly, the random index for the invalid sensitive data element '1' is 1, and so on, the random index for the invalid sensitive data element '3' is 3.

In accordance with an embodiment of the present disclosure, the one or more hardware processors 104 of FIG. 1 are configured to arrange sequentially, the first list of indexes in a first matrix and the second list of indexes in a second matrix, at 212 of the method 200. The first matrix comprises M number of rows and N number of columns, and the second matrix comprises P number of rows and Q number of columns.

In an embodiment, the number of columns (N) of the first matrix is obtained based on a number of indexes comprised in the first list of indexes of the first range of index. If the number of indexes is a perfect square, then the number of columns (N) of the first matrix is a square root of the number of indexes. If the number of indexes is not a perfect square, then the number of columns (N) of the first matrix is a square root of one of the possible perfect square nearest to the number of indexes comprised in the first list of indexes of first range of index. Similarly, the number of columns (Q) of the second matrix is obtained based on the number of indexes comprised in the second list of indexes of the second range of index. If the number of indexes is a perfect square, then the number of columns (N) of the second matrix is a square root of the number of indexes. If the number of indexes is not a perfect square, then the number of columns (N) of the second matrix is a square root of one of the possible perfect square nearest to the number of indexes comprised in the second list of indexes of the second range of index.

In the given example, the number of indexes comprised in the first range of index is 26 and since 26 is not the perfect square, the possible perfect square values are 25 and 36 which are nearest to 26. So the number of columns (N) of the first matrix is either 5 or 6, which are square root values of 25 and 36 respectively. Similarly, the number of indexes comprised in the second range of index is 9 and since 9 is a perfect square, the number of columns (Q) of the second matrix is 3, which is a square root value of 9.

In an embodiment, the number of rows (M) of the first matrix is obtained based on the number of columns (N) and the number of indexes comprised in the first range of index. Likewise, the number of rows (P) of the second matrix is obtained based on the number of columns (Q) and the number of indexes comprised in the second range of index.

In the given example, the number of rows (M) of the first matrix is '6', if the number of columns (N) of the first matrix is '5', as the number of indexes in the first range of index is '26'. Accordingly, the number of rows (M) of the first matrix is '5', if the number of columns (N) of the first matrix is '6', as the number of indexes in the first range of index is '26'. Similarly, the number of rows (P) of the second matrix is '3', as the number of columns (Q) of the second matrix is '3' and the number of indexes in the second range of index is '9'.

In the given example, the first matrix is $$\begin{bmatrix} 1 & 2 & 3 & 4 & 5 \\ 6 & 7 & 8 & 9 & 10 \\ 11 & 12 & 13 & 14 & 15 \\ 16 & 17 & 18 & 19 & 20 \\ 21 & 22 & 23 & 24 & 25 \\ 26 & X & X & X & X \end{bmatrix}$$

in case of the number of columns (N) and the number of rows (M) are 5 and 6 respectively. The first matrix is $$\begin{bmatrix} 1 & 2 & 3 & 4 & 5 & 6 \\ 7 & 8 & 9 & 10 & 11 & 12 \\ 13 & 14 & 15 & 16 & 17 & 18 \\ 19 & 20 & 21 & 22 & 23 & 24 \\ 25 & 26 & X & X & X & X \end{bmatrix}$$

in case of the number of columns (N) and the number of rows (M) are 6 and 5 respectively, where X represents a blank element. Similarly, the second matrix is $$\begin{bmatrix} 1 & 2 & 3 \\ 4 & 5 & 6 \\ 7 & 8 & 9 \end{bmatrix}$$

as the number of columns (Q) is 3 and the number of rows (P) is 3. The first matrix $$\begin{bmatrix} 1 & 2 & 3 & 4 & 5 \\ 6 & 7 & 8 & 9 & 10 \\ 11 & 12 & 13 & 14 & 15 \\ 16 & 17 & 18 & 19 & 20 \\ 21 & 22 & 23 & 24 & 25 \\ 26 & X & X & X & X \end{bmatrix}$$

is considered to explain in below description.

In accordance with an embodiment of the present disclosure, the one or more hardware processors 104 of FIG. 1 are configured to perform one or more rotation operations, at 214 of the method 200, based on the random key, sequentially in a first direction, on list of indexes comprised in each row and each column of the first matrix, and on the list of indexes comprised in each row and each column of the second matrix, to obtain a third matrix and a fourth matrix, respectively.

In an embodiment, a number of rotation operations for each row and column of the first matrix and the second matrix are obtained by using a random function and a hash code of the random key. The hash code of the predefined random key is obtained by the one or more hardware processors 104 of FIG. 1 and provided to the java based random function. The output of the random function obtained at each iteration sequentially, for each row and each column of the first matrix and for each column and each row of the second matrix, defines the number of rotation operations for the corresponding row or column of the first matrix or the second matrix. The third matrix is a resultant matrix after performing the number of rotation operations on the list of indexes comprised in each row and each column of the first matrix, in the sequential order. Similarly the fourth matrix is the resultant matrix after performing the number of rotation operations on the list of indexes comprised in each row and each column of the second matrix, in the sequential order.

In one embodiment, the one or more rotation operations may be performed first on each row at a time, then followed by each column in the sequential order. In another embodiment, the one or more rotation operations may be performed first on each column at a time, then followed by each row in the sequential order.

In an embodiment, the first direction is one of a clockwise direction or an anti-clockwise direction.

In an embodiment, the number of rotation operations are the outcome of the random function based on the random key. In an embodiment, the number of rotation operations may be same for each row. Alternatively, the number of rotation operations may be different for each row. In an embodiment, the number of rotation operations for each row may be same as that of number of rotation operations for the corresponding column. Alternatively, the number of rotation operations for each row may be different as that of number of rotation operations for the corresponding column. In an embodiment, the number of rotation operations for each row or each column of the first matrix may be same as that of the number of rotation operations for each row or each column of the second matrix. Alternatively, the number of rotation operations for each row or each column of the first matrix may be different as that of the number of rotation operations for each row or each column of the second matrix.

In the given example, the obtained third matrix is $$\begin{bmatrix} 9 & 25 & 16 & 17 & 18 \\ 23 & 14 & 5 & 21 & 22 \\ 3 & 9 & 10 & 26 & 2 \\ 7 & 8 & 24 & 15 & 1 \\ 12 & 13 & 4 & 20 & 6 \\ 11 & X & X & X & X \end{bmatrix}$$

after performing rotation operations on each column first and then on each row of the first matrix in the clockwise direction, with 3 rotation operation to $1^{st}$ column, 2 rotation operations to $2^{nd}$ column, 2 rotation operations to $3^{rd}$ column, 4 rotation operations to $4^{th}$ column, 1 (one) rotation operation to $5^{th}$ column, 2 rotation operations to $1^{st}$ row, 3 rotation operations to $2^{nd}$ row, 3 rotation operations to $3^{rd}$ row, 4 rotation operations to $4^{th}$ row, 4 rotation operations to $5^{th}$ row and 1 (one) rotation operation to $6^{th}$ row. The blank elements represented by 'X' are ignored while performing the rotation operations on each row and on each column of the first matrix. Similarly, the obtained fourth matrix is $$\begin{bmatrix} 5 & 9 & 7 \\ 8 & 3 & 1 \\ 6 & 4 & 2 \end{bmatrix},$$

after performing rotation operations on each column first and then on each row of the second matrix in the clockwise direction, with 1 (one) rotation operation to $1^{st}$ column, 2 rotation operations to $2^{nd}$ column, 1 (one) rotation operation to $3^{rd}$ column, 2 rotation operations to $1^{st}$ row, 2 rotation operations to $2^{nd}$ row and 1 (one) rotation operation to $3^{rd}$ row.

In accordance with an embodiment of the present disclosure, the one or more hardware processors 104 of FIG. 1 are configured to obtain the masked index for each of the one or more valid sensitive data elements and each of the at least one invalid sensitive data elements, at 216 of the method 200. The masked index for each of the one or more valid sensitive data elements is obtained based on the associated random index and the third matrix. Similarly, the masked index for each of the at least one invalid sensitive data elements is obtained based on the associated random index and the fourth matrix.

In an embodiment, the masked index for each of the one or more valid sensitive data elements is obtained by mapping the position of the associated random index in the third matrix. Similarly, the masked index for each of the at least one invalid sensitive data elements is obtained by mapping the position of the associated random index in the fourth matrix.

In the given example, the random index for the valid sensitive data element 'B' is 2 which is positioned as 15th element in the third matrix, hence the masked index for the valid sensitive data element 'B' is 15 and so on, the masked index for the valid sensitive data element 'Z' is 14. Similarly, the random index for the valid sensitive data element '1' is 1 which is positioned as 6th element in the fourth matrix, hence the masked index for the invalid sensitive data element '1' is 6 and so on, the masked index for the invalid sensitive data element '3' is 5.

In accordance with an embodiment of the present disclosure, the one or more hardware processors 104 of FIG. 1 are configured to generate a masked data element for each of the one or more valid sensitive data elements and each of the at least one invalid sensitive data elements, at 218 of the method 200. The masked data element for each of the one or more valid sensitive data elements is generated based on the associated masked index, the first regular expression and the valid input dataset. Likewise, the masked data element for each of the at least one invalid sensitive data elements is generated based on the associated masked index, the second regular expression and the invalid input dataset. A masked dataset for the input dataset is formed, by combining the associated masked data elements of each of the one or more valid sensitive data elements and each of the at least one invalid sensitive data elements.

In an embodiment, the masked data element for each of the one or more valid sensitive data elements, is generated by mapping the associated mask index to the first list of indexes, and then identifying the corresponding element in the first regular expression. Likewise, the masked data element for each of the at least one invalid sensitive data elements, is generated by mapping the associated mask index to the second list of indexes, and then identifying the corresponding element in the second regular expression.

In the given example, the masked index for the valid sensitive data element 'B' is 15, so the masked data element for the valid sensitive data element 'B' is 'O' which is present at 15th position in the first regular expression [A-Z]{1}. Likewise, the masked index for the invalid sensitive data element '1' is 6, so the masked data element for the invalid sensitive data element '1' is '6' which is present at the 6th position in the second regular expression [1-9]{1}. So the masked data elements for the valid sensitive data elements {B, C, T, W, H, S, K, Z} comprised in the valid input dataset are {O, K, X, F, V, L, Z, N}. Similarly, the masked data elements for the invalid sensitive data elements {1, 4, 6, 3} comprised in the invalid input dataset are {6, 8, 7, 5}. The masked dataset for the sample input dataset {B, C, T, 1, 4, W, H, S, 6, K, 3, Z} is {O, K, X, 6, 8, F, V, L, 7, Z, 5, N}. A person skilled in the art may observe that the each masked data element has same format of the sensitive data element comprised in the sample input dataset.

Figure 3A:
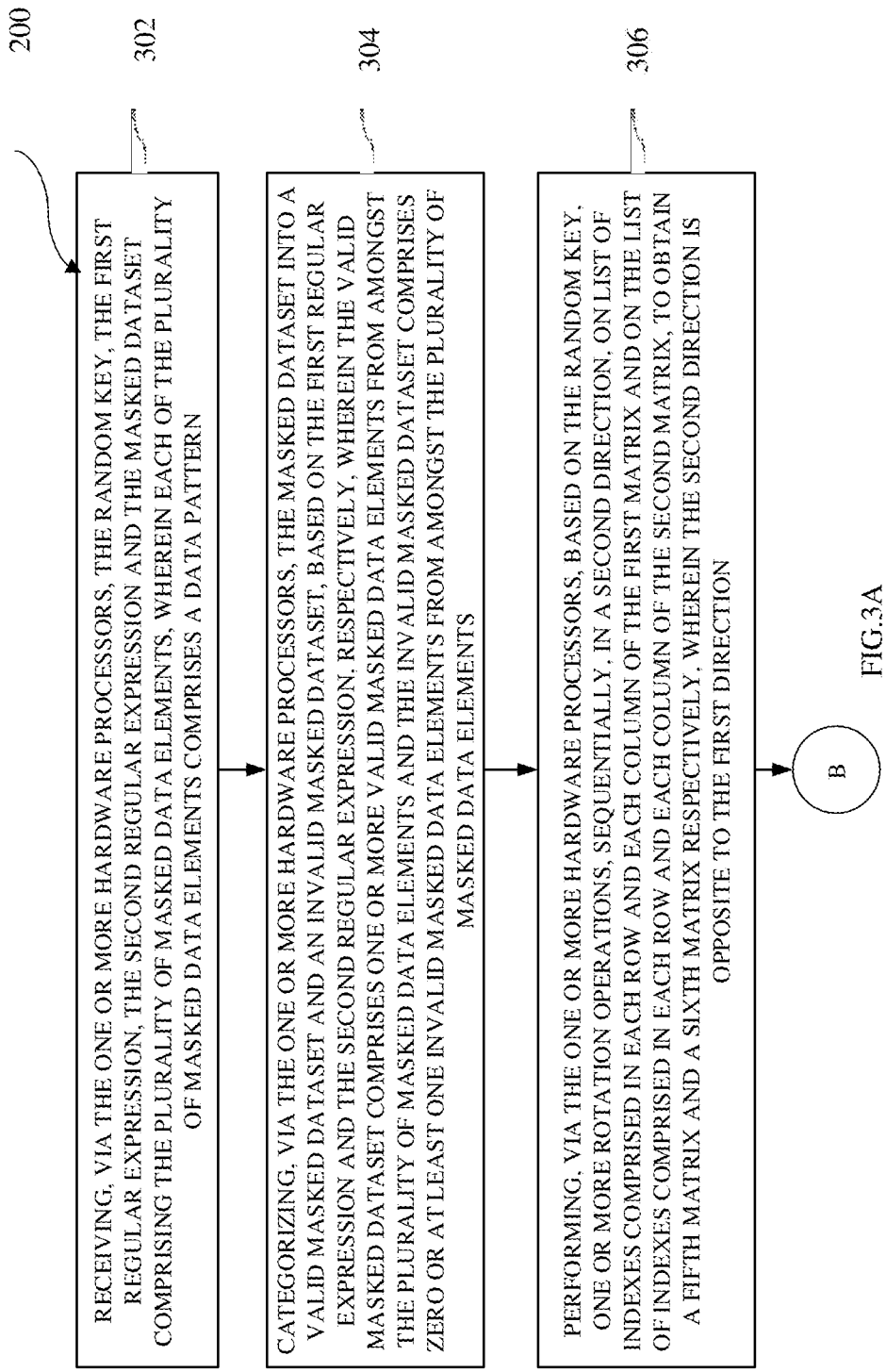
FIG. 3A and FIG. 3B illustrate exemplary flow diagrams of a processor implemented method for unmasking of masked data, in accordance with an embodiment of the present disclosure.
Figure 3B:
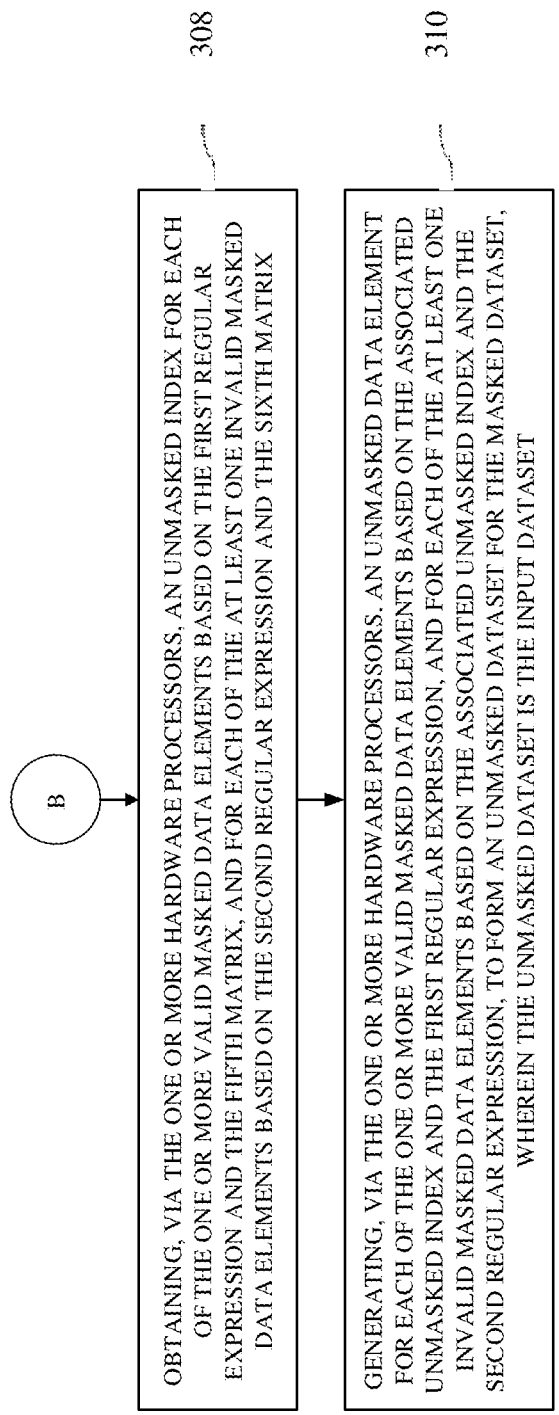

FIG. 3A and FIG. 3B illustrate exemplary flow diagrams of a processor implemented method 200 for unmasking of masked data, in accordance with an embodiment of the present disclosure. The steps of the method 200 with reference to FIG. 3A and FIG. 3B will now be explained in detail with reference to the system 100. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the one or more hardware processors 104 of FIG. 1 are further configured to unmask the masked dataset. In an embodiment, the one or more hardware processors 104 of FIG. 1 are further configured to receive the random key, the first regular expression, the second regular expression and the masked dataset comprising the plurality of masked data elements, at 302 of the method 200. Each masked data element of the plurality of masked data elements comprises the associated data pattern. The associated data pattern of one masked data element may be same or different to the associated data pattern of another masked data element. The masked dataset may be received in the file or document format, obtained from the data source, the database, the data file and the like in which the plurality of masked data elements are stored or maintained in the organization. The masked dataset may be the set of data fields present in one column comprised in the database for example. If the database comprises multiple columns, then the set of data fields present in one column are received at a time, by the one or more hardware processors 104 of FIG. 1.

The random key and the first regular expression received at 302 of the method 200 are the same as that of the random key and the first regular expression received at 202 of the method 200 during the masking process. Also, the second regular expression received at 302 of the method 200 is the same as that of the second regular expression received at 206 of the method 200 during the masking process. The sample masked dataset according to the given example is {O, K, X, 6, 8, F, V, L, 7, Z, 5, N}, the first regular expression is [A-Z]{1}, the second regular expression is [1-9]{1}, and the random key is 'DataPlus'.

The one or more hardware processors 104 of FIG. 1 are further configured to categorize, the masked dataset into a valid masked dataset and an invalid masked dataset, at 304 of the method 200. The masked dataset is categorized into the valid masked dataset and the invalid masked dataset based on the first regular expression and the second regular expression, respectively. The valid masked dataset comprises one or more valid masked data elements from amongst the plurality of masked data elements whose data pattern matches the data pattern of the first regular expression. The data elements of the one or more valid masked data elements comprised in the valid masked dataset are placed sequentially in the order in which they have received.

The invalid masked dataset comprises zero or at least one of invalid masked data elements from amongst the plurality of masked data elements. The invalid masked dataset comprises zero invalid masked data elements i.e, no invalid masked data elements, when the data pattern of the second regular expression does not match the data patterns of all the masked data elements from the plurality of masked data elements comprised in the masked dataset. If zero invalid masked data elements are determined to be present in the invalid masked dataset, then the method 200 generate the unmasked dataset only based on the valid masked input dataset.

The invalid masked dataset comprises at least one invalid masked data elements, when the data pattern of the second regular expression matches the data patterns of at least one of the masked data element from the plurality of masked data elements comprised in the masked dataset. The data elements of the at least one invalid masked data elements comprised in the invalid masked dataset are placed sequentially in the order in which they have received.

In the given example, the sample masked dataset {O, K, X, 6, 8, F, V, L, 7, Z, 5, N} is categorized into the valid masked dataset having the valid masked data elements {O, K, X, F, V, L, Z, N} and the invalid masked dataset having the invalid masked data elements {6, 8, 7, 5}, based on the first regular expression [A-Z]{1} and the second regular expression [1-9]{1} respectively.

The one or more hardware processors 104 of FIG. 1 are further configured to perform, the one or more rotation operations, sequentially, in a second direction, based on the random key, at 306 of the method 200, on the list of indexes comprised in each row and each column of the first matrix and on the list of indexes comprised in each row and each column of the second matrix, to obtain a fifth matrix and a sixth matrix respectively.

In one embodiment, the one or more rotation operations may be performed first on each row at a time, then followed by each column in the sequential order, if the one or more rotation operations may be performed first on each column at a time and then followed by each row in the sequential order, at 214 of the method 200 during the masking process. In another embodiment, the one or more rotation operations may be performed first on each column at a time and then followed by each row in the sequential order, if the one or more rotation operations may be performed first on each row at a time and then followed by each column in the sequential order, at 214 of the method 200 during the masking process.

The number of rotation operations for each row and each column of the first matrix and the second matrix at 306 of the method 200, are exactly same as that of number of rotation operations performed for each row and each column of the first matrix and the second matrix, at 214 of the method 200 during the masking process, as the same random key is used.

In an embodiment, the one or more rotation operations are performed in the second direction, wherein the second direction is opposite to the first direction. If the first direction is the clockwise direction at 214 of the method 200 during the masking process, then the second direction is the anti-clockwise direction. If the first direction is the anti-clockwise direction at 214 of the method 200 during the masking process, then the second direction is the clockwise direction.

$$\begin{bmatrix} 20 & 15 & 11 & 23 & 8 \\ 25 & 16 & 17 & 1 & 13 \\ 26 & 21 & 22 & 7 & 19 \\ 3 & 4 & 5 & 12 & 24 \\ 9 & 10 & 6 & 18 & 2 \\ 14 & X & X & X & X \end{bmatrix}$$

In the given example, the fifth matrix is obtained, after performing the same number of rotation operations on each row first and then on each column of the first matrix in the anti-clockwise direction.

$$\begin{bmatrix} 6 & 9 & 5 \\ 8 & 1 & 7 \\ 3 & 4 & 2 \end{bmatrix}$$

Similarly, the sixth matrix is obtained after performing the same number of rotation operations on each row first and then on each column of the second matrix in the anti-clockwise direction.

The one or more hardware processors 104 of FIG. 1 are further configured to obtain the unmasked index for each of the one or more valid masked data elements and each of the at least one invalid masked data elements, at 308 of the method 200. The unmasked index for each of the one or more valid masked data elements is obtained based on the first regular expression and the fifth matrix. Likewise, the unmasked index for each of the at least one invalid masked data elements is obtained based on the second regular expression and the sixth matrix.

In an embodiment, the unmasked index for each of the one or more valid masked data elements is obtained by identifying the position of the associated valid masked data element in the first regular expression and then mapping the identified position with the fifth matrix. Similarly, the unmasked index for each of the at least one invalid masked data elements is obtained by identifying the position of the associated invalid masked data element in the second regular expression and then mapping the identified position with the sixth matrix.

In the given example, the position of the valid masked data element '0' in the first regular expression is 15 which is present at $2^{nd}$ position in the fifth matrix. So the unmasked index for the valid masked data element '0' is 2 and so on, the unmasked index for the valid masked data element 'N' is 26. Likewise, the position of the invalid masked data element '6' in the second regular expression is 6 which is present at $1^{st}$ position in the sixth matrix. So the unmasked index for the invalid masked data element '6' is 1 and so on, the unmasked index for the invalid masked data element '3' is 5.

The one or more hardware processors 104 of FIG. 1 are further configured to generate an unmasked data element for each of the one or more valid masked data elements and each of the at least one invalid masked data elements, at 310 of the method 200. The unmasked data element for each of the one or more valid masked data elements is generated based on the associated unmasked index and the first regular expression. Similarly, the unmasked data element for each of the at least one invalid masked data elements is generated based on the associated unmasked index and the second regular expression. An unmasked dataset for the masked dataset is formed by combining the associated unmasked data elements of each of the one or more valid masked data elements and each of the at least one invalid masked data elements. The obtained unmasked dataset to be same as that of the input dataset in order to achieve the consistency of the masking and unmasking process.

In the given example, the unmasked index for the valid masked data element '0' is 2 which is indicating B in the first regular expression, so the unmasked data element for the valid masked data element '0' is 'B'. Likewise, the unmasked index for the invalid masked data element '6' is 1, so the unmasked data element for the invalid masked data element '6' is '1'. The unmasked data elements for the valid masked data elements {0, K, X, F, V, L, Z, N} comprised in the valid masked dataset are {B, C, T, W, H, S, K, Z}. Similarly, the unmasked data elements for the invalid masked data elements {6, 8, 7, 5} comprised in the invalid masked dataset are {1, 4, 6, 3}. The unmasked dataset for the sample masked dataset {0, K, X, 6, 8, F, V, L, 7, Z, 5, N} is {B, C, T, 1, 4, W, H, S, 6, K, 3, Z}. A person skilled in the art may observe that the unmasked dataset is the same as that of the sample input dataset.

In an embodiment, different masked datasets may be generated for the same input dataset by changing the random key. A change in the random key enable the random function to produce different number of rotation operation at each iteration, different masked indexes may be generated, as a result, different versions of the masked data may be achieved at each iteration. But the input dataset may be re-generated in the original form, through any version of the masked dataset using the random key and the unmasked index.

Various embodiments disclose the method 200 may generate different versions of masked data for the same input dataset by changing the random key, and the same input dataset is retrieved back with any masked data version, hence consistency of the masking technique is achieved. The valid masked data element is generated for valid input data element and the invalid masked data element is generated for invalid input data element, hence the same format of the masked data is generated and the original form of the input dataset is highly secured as it is difficult to predict the original form of the input dataset from generated masked dataset.

Various embodiments disclose the method 200 generates a different masked data element even for more occurrences of same sensitive data element in the input dataset, hence a unique masked data element is generated for each unique sensitive data element.

Various embodiments disclose the method 200 consumes less processing time, as the masking process and the unmasking process make operations on the indexes rather than with the input dataset, being the fact that the processing time for doing operations on the text (input dataset) will be more compared to the numbers (indexes). The method 200 is simple and economic as less number of computations are involved during the masking process and the unmasking process.

Example Scenario

In an example scenario, the masking and the unmasking of the sensitive data is performed on the dataset having 10 million number of sensitive data elements using the system 100 in Java language, on dual core i5-3320M processors with clock speed of 2.60 GHz and on Windows 10™ 64-bit operating system. The masking time, unmasking time, total masking and unmasking time for different kinds of the dataset are mentioned in Table. 1:

TABLE 1

| Dataset | Processing time for masking (Sec) | Processing time for unmasking (Sec) | Total processing time (Sec) |
|---|---|---|---|
| Dataset having 10 million valid sensitive data elements | 9.085 | 13.485 | 22.57 |
| Dataset having 99,99,998 valid and 2 invalid sensitive data elements | 9.541 | 13.957 | 23.498 |

As is seen from the Table. 1, the method 200 consumed the processing time of 9.085 sec for masking the dataset having 10 million number of sensitive data elements with same data pattern. The processing time for unmasking the same dataset is 13.485, results in total processing time of 22.57 sec for both masking and unmasking. We may observe that the processing time for the masking and the unmasking has slightly increased by around 0.5 sec when the dataset having 2 invalid sensitive data elements (different data pattern compared to remaining sensitive data elements) out of the 10 million number of sensitive data elements.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:
   receiving, via one or more hardware processors, an input dataset comprising a plurality of sensitive data elements, a random key and a first regular expression, wherein each of the plurality of sensitive data elements comprises a data pattern, the first regular expression is received based on the data pattern of the plurality of sensitive data elements;

categorizing, via the one or more hardware processors, the input dataset into a valid input dataset and an invalid input dataset, based on the first regular expression, wherein the valid input dataset comprises one or more valid sensitive data elements from amongst the plurality of sensitive data elements and the invalid input dataset comprises zero or at least one invalid sensitive data elements from amongst the plurality of sensitive data elements;

receiving, via the one or more hardware processors, a second regular expression based on the data pattern of the at least one invalid sensitive data elements comprised in the invalid input dataset;

identifying, via the one or more hardware processors, a first range of index based on a number of elements comprised in the first regular expression and a second range of index based on the number of elements comprised in the second regular expression, wherein the first range of index comprises a first list of indexes and the second range of index comprises a second list of indexes;

obtaining, via the one or more hardware processors, a random index for each of the one or more valid sensitive data elements based on a position of the associated valid sensitive data element in the first list of indexes and a random index for each of the at least one invalid sensitive data elements based on a position of the associated invalid sensitive data element in the second list of indexes;

arranging sequentially, via the one or more hardware processors, the first list of indexes in a first matrix and the second list of indexes in a second matrix, wherein the first matrix comprises M number of rows and N number of columns, and the second matrix comprises P number of rows and Q number of columns;

performing, via the one or more hardware processors, based on the random key, one or more rotation operations, sequentially, in a first direction, on list of indexes comprised in each row and each column of the first matrix, and on the list of indexes comprised in each row and each column of the second matrix, to obtain a third matrix and a fourth matrix, respectively;

obtaining, via the one or more hardware processors, a masked index for each of the one or more valid sensitive data elements based on the associated random index and the third matrix, and a masked index for each of the at least one invalid sensitive data elements based on the associated random index and the fourth matrix; and generating, via the one or more hardware processors, a masked data element for each of the one or more valid sensitive data elements based on the associated masked index, the first regular expression and the first list of indexes, and a masked data element for each of the at least one invalid sensitive data elements based on the associated masked index, the second regular expression and the second list of indexes, to form a masked dataset for the input dataset.

2. The method of claim 1, wherein the number of columns (N) of the first matrix is obtained based on a number of indexes comprised in the first range of index, and the number of columns (Q) of the second matrix is obtained based on the number of indexes comprised in the second range of index.

3. The method of claim 1, wherein the number of rows (M) of the first matrix is obtained based on the number of columns (N) and the number of indexes comprised in the first range of index, and the number of rows (P) of the second matrix is obtained based on the number of columns (Q) and the number of indexes comprised in the second range of index.

4. The method of claim 1, wherein the number of rotation operations for each row and each column of the first matrix and the second matrix are obtained by using a random function and a hash code of the random key.

5. The method of claim 1, further comprising unmasking the masked dataset, where unmasking the masked dataset comprises:

receiving, via the one or more hardware processors, the random key, the first regular expression, the second regular expression and the masked dataset comprising the plurality of masked data elements, wherein each of the plurality of masked data elements comprises a data pattern;

categorizing, via the one or more hardware processors, the masked dataset into a valid masked dataset and an invalid masked dataset, based on the first regular expression and the second regular expression, respectively, wherein the valid masked dataset comprises one or more valid masked data elements from amongst the plurality of masked data elements and the invalid masked dataset comprises zero or at least one invalid masked data elements from amongst the plurality of masked data elements;

performing, via the one or more hardware processors, based on the random key, one or more rotation operations, sequentially, in a second direction, on list of indexes comprised in each row and each column of the first matrix and on the list of indexes comprised in each row and each column of the second matrix, to obtain a fifth matrix and a sixth matrix respectively, wherein the second direction is opposite to the first direction;

obtaining, via the one or more hardware processors, an unmasked index for each of the one or more valid masked data elements based on the first regular expression and the fifth matrix, and for each of the at least one invalid masked data elements based on the second regular expression and the sixth matrix; and generating, via the one or more hardware processors, an unmasked data element for each of the one or more valid masked data elements based on the associated unmasked index and the first regular expression, and for each of the at least one invalid masked data elements based on the associated unmasked index and the second regular expression, to form an unmasked dataset for the masked dataset, wherein the unmasked dataset is the input dataset.

6. A system for masking and unmasking of sensitive data, the system comprising:

a memory storing instructions;

one or more communication interfaces; and one or more hardware processors coupled to the memory via the one or more communication interfaces, wherein the one or more hardware processors are configured by the instructions to:

receive an input dataset comprising a plurality of sensitive data elements, a random key and a first regular expression, wherein each of the plurality of sensitive data elements comprises a data pattern, the first regular expression is received based on the data pattern of the plurality of sensitive data elements;

categorize the input dataset into a valid input dataset and an invalid input dataset, based on the first regular expression, wherein the valid input dataset comprises one or more valid sensitive data elements from amongst the plurality of sensitive data elements and the invalid input dataset comprises zero or at least one invalid sensitive data elements from amongst the plurality of sensitive data elements;

receive a second regular expression based on the data pattern of the at least one invalid sensitive data elements comprised in the invalid input dataset;

identify a first range of index based on a number of elements comprised in the first regular expression and a second range of index based on the number of elements comprised in the second regular expression, wherein the first range of index comprises a first list of indexes and the second range of index comprises a second list of indexes;

obtain a random index for each of the one or more valid sensitive data elements based on a position of the associated valid sensitive data element in the first list of indexes and a random index for each of the at least one invalid sensitive data elements based on a position of the associated invalid sensitive data element in the second list of indexes;

arrange sequentially, the first list of indexes in a first matrix and the second list of indexes in a second matrix, wherein the first matrix comprises M number of rows and N number of columns, and the second matrix comprises P number of rows and Q number of columns;

perform, based on the random key, one or more rotation operations, sequentially, in a first direction, on list of indexes comprised in each row and each column of the first matrix, and on the list of indexes comprised in each row and each column of the second matrix, to obtain a third matrix and a fourth matrix, respectively;

obtain a masked index for each of the one or more valid sensitive data elements based on the associated random index and the third matrix, and a masked index for each of the at least one invalid sensitive data elements based on the associated random index and the fourth matrix; and generate a masked data element for each of the one or more valid sensitive data elements based on the associated masked index, the first regular expression and the first list of indexes, and a masked data element for each of the at least one invalid sensitive data elements based on the associated masked index, the second regular expression and the second list of indexes, to form a masked dataset for the input dataset.

7. The system of claim 6, wherein the number of columns (N) of the first matrix is obtained based on a number of indexes comprised in the first range of index, and the number of columns (Q) of the second matrix is obtained based on the number of indexes comprised in the second range of index.

8. The system of claim 6, wherein the number of rows (M) of the first matrix is obtained based on the number of columns (N) and the number of indexes comprised in the first range of index, and the number of rows (P) of the second matrix is obtained based on the number of columns (Q) and the number of indexes comprised in the second range of index.

9. The system of claim 6, wherein the number of rotation operations for each row and each column of the first matrix and the second matrix are obtained by using a random function and a hash code of the random key.

10. The system of claim 6, wherein the one or more hardware processors are further configured to unmask the masked dataset, where unmask the masked dataset comprises:

receive the random key, the first regular expression, the second regular expression and the masked dataset comprising the plurality of masked data elements, wherein each of the plurality of masked data elements comprises a data pattern;

categorize the masked dataset into a valid masked dataset and an invalid masked dataset, based on the first regular expression and the second regular expression, respectively, wherein the valid masked dataset comprises one or more valid masked data elements from amongst the plurality of masked data elements and the invalid masked dataset comprises zero or at least one invalid masked data elements from amongst the plurality of masked data elements;

perform, based on the random key, one or more rotation operations, sequentially, in a second direction, on list of indexes comprised in each row and each column of the first matrix and on the list of indexes comprised in each row and each column of the second matrix, to obtain a fifth matrix and a sixth matrix respectively, wherein the second direction is opposite to the first direction;

obtain an unmasked index for each of the one or more valid masked data elements based on the first regular expression and the fifth matrix, and for each of the at least one invalid masked data elements based on the second regular expression and the sixth matrix; and generate an unmasked data element for each of the one or more valid masked data elements based on the associated unmasked index and the first regular expression, and for each of the at least one invalid masked data elements based on the associated unmasked index and the second regular expression, to form an unmasked dataset for the masked dataset, wherein the unmasked dataset is the input dataset.

11. A computer program product comprising a non-transitory computer readable medium having a computer readable program embodied therein, wherein the computer readable program, when executed on a computing device, causes the computing device to:

receive an input dataset comprising a plurality of sensitive data elements, a random key and a first regular expression, wherein each of the plurality of sensitive data elements comprises a data pattern, the first regular expression is received based on the data pattern of the plurality of sensitive data elements;

categorize the input dataset into a valid input dataset and an invalid input dataset, based on the first regular expression, wherein the valid input dataset comprises one or more valid sensitive data elements from amongst the plurality of sensitive data elements and the invalid input dataset comprises zero or at least one invalid sensitive data elements from amongst the plurality of sensitive data elements;

receive a second regular expression based on the data pattern of the at least one invalid sensitive data elements comprised in the invalid input dataset;

identify a first range of index based on a number of elements comprised in the first regular expression and a second range of index based on the number of elements comprised in the second regular expression, wherein the first range of index comprises a first list of indexes and the second range of index comprises a second list of indexes;

obtain a random index for each of the one or more valid sensitive data elements based on a position of the associated valid sensitive data element in the first list of indexes and a random index for each of the at least one invalid sensitive data elements based on a position of the associated invalid sensitive data element in the second list of indexes;

arrange sequentially, the first list of indexes in a first matrix and the second list of indexes in a second matrix, wherein the first matrix comprises M number of rows and N number of columns, and the second matrix comprises P number of rows and Q number of columns;

perform, based on the random key, one or more rotation operations, sequentially, in a first direction, on list of indexes comprised in each row and each column of the first matrix, and on the list of indexes comprised in each row and each column of the second matrix, to obtain a third matrix and a fourth matrix, respectively;

obtain a masked index for each of the one or more valid sensitive data elements based on the associated random index and the third matrix, and a masked index for each of the at least one invalid sensitive data elements based on the associated random index and the fourth matrix; and generate a masked data element for each of the one or more valid sensitive data elements based on the associated masked index, the first regular expression and the first list of indexes, and a masked data element for each of the at least one invalid sensitive data elements based on the associated masked index, the second regular expression and the second list of indexes, to form a masked dataset for the input dataset.

\* \* \* \* \*